United States Patent [19]

Takada

[11] 4,400,014
[45] Aug. 23, 1983

[54] COUPLING DEVICE FOR CONNECTING A DRIVE ELEMENT TO A BELT TRANSFER MEMBER IN A PASSIVE VEHICLE OCCUPANT RESTRAINT BELT SYSTEM

[76] Inventor: Juichiro Takada, 3-12-1 Shinmachi, Tokyo, Japan, 105

[21] Appl. No.: 319,897

[22] Filed: Nov. 10, 1981

[51] Int. Cl.³ .............................................. A62B 35/02
[52] U.S. Cl. ..................................... 280/804; 297/468
[58] Field of Search ....................... 280/804, 807, 808; 297/468, 469; 403/326, 360

[56] References Cited

U.S. PATENT DOCUMENTS

| | | | |
|---|---|---|---|
| 4,288,097 | 9/1981 | Ueda | 297/468 |
| 4,334,701 | 6/1982 | Takada | 280/804 |
| 4,354,695 | 10/1982 | Sato | 280/804 |
| 4,365,827 | 12/1982 | Takada | 280/804 |

Primary Examiner—Joseph F. Peters, Jr.
Assistant Examiner—John A. Carroll
Attorney, Agent, or Firm—Brumbaugh, Graves, Donohue & Raymond

[57] ABSTRACT

A coupling device for connecting a drive element to a belt transfer member in a passive vehicle occupant restraint belt system comprises a fitting on the end of the drive element that is received into a generally U-shaped receptacle on the transfer member and held in place by a U-shaped leaf spring retainer. The fittng has one or more annular, outwardly projecting flanges that fit into and engage openings in the walls of the receptacle to transmit driving force from the fitting to the receptacle.

4 Claims, 5 Drawing Figures

COUPLING DEVICE FOR CONNECTING A DRIVE ELEMENT TO A BELT TRANSFER MEMBER IN A PASSIVE VEHICLE OCCUPANT RESTRAINT BELT SYSTEM

FIELD OF THE INVENTION

The present invention relates to a passive vehicle occupant restraint belt system and, more particularly, to a coupling device for joining the transfer member of the belt guide sub-assembly to the belt drive member of the belt guide sub-assembly of the system.

BACKGROUND OF THE INVENTION

In recent years considerable resources have been dedicated to the development of passive-type vehicle occupant restraint belt systems, that is, the type of occupant restraint system that operates by automatically moving a restraint belt to an occupant restraining position when the vehicle door is closed and automatically moving the belt to a release configuration when the door is opened. Many passive restraint belt systems have a belt transfer member, either a belt transfer ring or a movable belt anchor, that is driven back and forth by a drive device, such as a gear reduced electric motor or a mechanical motion amplifier, along a guide rail. The back and forth motion of the belt transfer member is transmitted to the transfer member from the drive device by a drive element, such as a racked wire, driven by an output gear of the drive device.

In most passive belt systems proposed heretofore, the drive wire has been fastened to the belt transfer member by a coupling device that is more or less permanent and is pre-installed by the manufacturer of the belt system. Indeed, the guide elements of the system, which include the guide rail, the belt transfer member and, in the case of a moving anchor, the locking device for the moving anchor, and the drive elements, which include the drive device and the drive element, constitute a single assembly. This single assembly is then installed in the vehicle during manufacture of the vehicle. The fact that the guide and drive parts of the passive belt system are made as a single assembly makes it more difficult to install the system in the production line of a modern vehicle assembly plant, and also makes it more difficult to disassemble the system for repair or replacement, should that be necessary.

It is apparent, then, that it is desirable that the passive system be manufactured as two sub-assemblies or groups, a belt guide group and a drive group. There then arises the problem of how to connect the two groups quickly and easily. One possibility is to provide an opening in the guide rail at a location near the restraint position of the belt transfer member for access to a suitable coupling that can be made between the belt transfer member and the drive wire after the guide group and drive group have been installed. While this solution is workable, it can slow down the assembly procedure because it is difficult to work within a very small opening in the guide rail. Moreover, the types of couplings suggested in the past involve rigid attachment of the drive wire to the belt transfer member, and the way in which the final assembly is accomplished leaves open the possibility that the drive wire may be twisted when it is done up and thereby impart a twisting force on the transfer member and a torsion stress in the wire. Rotational force imparted to the transfer member may effect the smooth running of the transfer member along the guide rail, and the torsion stress in the wire is undesirable.

SUMMARY OF THE INVENTION

An object of the present invention is to provide a coupling between the drive wire of the drive group and the belt transfer member of the guide group of a passive belt system that is simple and quick to connect and eliminates torsion stresses in the wire and twisting forces on the belt transfer member. The coupling is useful in various passive vehicle occupant belt systems of the type having a belt transfer member that engages the belt and is received for movement along a guide rail between a restraint location in which the belt is held in a configuration for restraining the occupant and a release location in which the belt is held in a configuration for releasing the occupant. The belt transfer member and the guide rail constitute a belt guide group, which is a sub-assembly that is completely manufactured and preassembled and delivered to the vehicle assembly plant for installation separate from the drive group. In most systems the belt guide group will involve a guide rail that is mounted at the edge of the vehicle roof generally above the door for use with a shoulder belt, but there are also systems with which the invention is useful in which the guide rail is mounted on the inside of the door and operates in connection with a lap belt. The invention can also be used in systems having a guide rail mounted on a center console between the vehicle seats or on the inboard side of the seat itself.

The drive group is a sub-assembly that comprises a gear-reduced electric motor or a mechanical motion amplifier for producing motion and transmitting that motion to an elongated drive element. In a preferred embodiment, the elongated drive element is a racked wire that consists of a core wire having a tooth wire wound helically around it and secured to it. The racked wire meshes with an output gear of the drive device and may be of a length only slightly greater than the distance along which the belt transfer member moves. The remaining part of drive wire may have a plastic covering which provides smooth and quiet running of the drive wire through a sheath and back and forth along the guide rail. In most passive systems that employ a gear-reduced electric motor, the motor is energized by a door switch that transfers in response to opening the door to drive the drive wire in a direction to move the belt transfer member to the restraint position and is then stopped by a limit switch operated by the transfer member, by a bead on the drive wire or a control cam associated with the gear drive. The motor is energized in the opposite direction upon closing the door and drives the belt transfer member to the restraint position where it is stopped by another limit switch. In the case of a mechanical motion amplifier the movement of the door is transmitted to a mechanical linkage, a gear train or the like which, in turn, imparts driving motion through an output gear to the racked wire in opposite directions upon opening and closing motions of the door.

A coupling, according to the present invention, comprises a fitting fastened to the end portion of the drive element and having a shaft portion extending co-axially with the end portion of the drive element and at least one annular flange portion having a diameter substantially greater than the diameter of the shaft portion and projecting generally radially from the shaft portion. There is a generally U-shaped receptacle on the transfer member that has a width large enough to accept the shaft portion of the fitting and substantially less than the diameter of the flange portion. The receptacle has oppositely located slots that receive portions of the flange portion of the fitting. A generally U-shaped retainer leaf spring received and held in place in the receptacle holds the fitting in place in the receptacle by means of spaced-apart resilient leg portions that straddle the flange portion of the fitting and partly overlie the shaft portion of the fitting. The leg portions of the leaf spring are resiliently deflectable to enable the fitting to be pushed into the receptacle into a position in which the leg portions retain it therein.

In a preferred embodiment of the coupling, the leaf spring has a tab that is received in one of the slots in the receptacle and engages an end of that slot to retain the spring in the receptacle. The fitting may have two, three or more projecting flange portions that are spaced apart from each other lengthwise of the shaft portion, in which case the receptacle will have additional slots or holes for receiving portions of the flange portions of the fitting on the drive element. For example, there may be three flange portions on the fitting, and two holes in one wall of the U-shaped receptacle. The two outermost flange portions of the fitting straddle and engage opposite edges of a leg portion of the receptacle, the leg portion being a flange and having a generally medial slot that opens at the free end and receives part of the middle flange of the fitting.

For a better understanding of the invention reference may be made of the following description of exemplary embodiments, taken in conjunction with the figures of the accompanying drawings.

DESCRIPTION OF EXEMPLARY EMBODIMENTS

Figure 1:
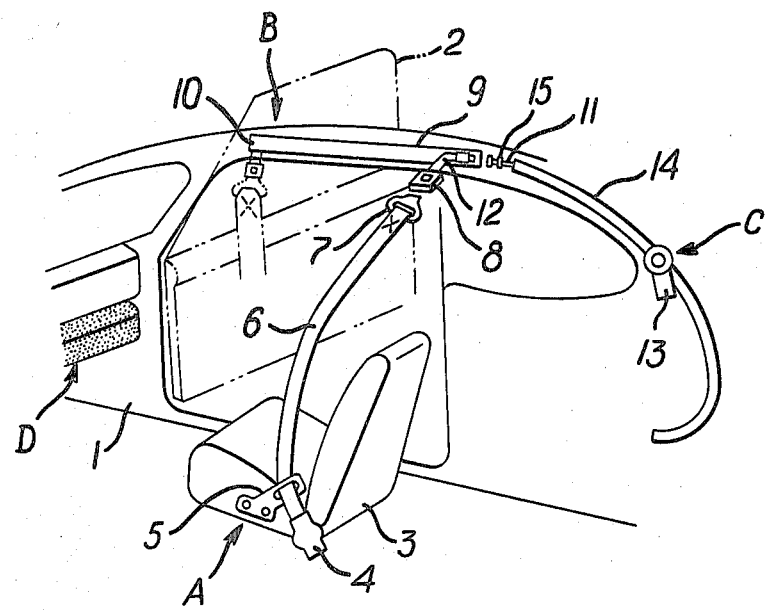
FIG. 1 is a pictorial view in generally schematic form of an exemplary passive vehicle occupant restraint belt system with which the present invention is useful.

The restraint belt system shown in FIG. 1 is manufactured in three sub-assemblies or groups, namely, a belt group A, a guide group B and a drive group C. In addition, there is an energy-absorbing knee bolster D installed under the dashboard of the vehicle 1 that protects the lower body of an occupant of the vehicle seat 3. The belt group A comprises a shoulder belt 6 that extends from a retractor 4 attached at the inboard side of the seat, preferably to the vehicle floor, passes through a guide 5 on the inboard side of the seat and leads upwardly and outwardly across the vehicle seat where it is attached by means of a buckle tongue 7 to an emergency release buckle 8. The buckle 8 is an element of the guide group B.

The guide group B comprises a generally C-shaped guide rail 10 that is fastened to and extends along the edge of the vehicle roof 9 generally above the door 2. A belt transfer member 12 having an arm portion carrying the emergency release buckle 8 slides backward and forward along the guide rail 10 between a rearward restraint position in which the shoulder belt extends across the occupant's torso and restrains the occupant in a safe position and a forward release location (shown in phantom lines in FIG. 1) in which the belt is held forward away from the occupant so that he or she can enter or leave the vehicle. In the embodiment shown in the drawings, the belt transfer member 12 is a movable anchor, and a suitable device (not shown) is provided for locking the anchor at the restraint location and for releasing it to enable it to move to the release location. One form of such device, which be the produced in various designs, includes a locking pawl 30 (see FIG. 3) that engages a locking notch 29 in the movable anchor. The locking device for the movable anchor and the details of the anchor are not parts of the present invention. Reference may be made to Takada U.S. patent application No. 044,196 filed May 31, 1979 entitled "Vehicle Occupant Shoulder Belt with a Movable-Lockable Anchor" for a full description and illustration of suitable movable anchor systems for use in passive vehicle occupant restraint belt systems. The guide rail 10, the movable anchor 12 and the locking device for the movable anchor constitute a separate sub-assembly of the belt system, namely the guide group B previously referred to. The guide group is installed in the vehicle at a suitable point along the vehicle assembly line. Likewise, the belt group A is installed in the vehicle separately from the guide group.

In the embodiments shown in the drawings (FIG. 1), the drive group comprises a gear-reduced electric motor 13 energized in the manner described above and having an output gear that drives a racked wire portion of a drive wire 11. The drive wire 11 is received within a sheath 14 that is suitably affixed to the vehicle body and establishes a path of predetermined shape and distance along which the drive wire is constrained to move. The drive group C is installed in the vehicle at any suitable point along the assembly line.

During the manufacture of the drive group C a fitting 16, which constitutes one element of the coupling, is installed on the free end of the drive wire 11. The fitting 16 comprises three annular flanges 17, 18 and 19 that project substantially radially outwardly from a shaft portion that is coaxial with the axis of the drive wire 11, such shaft portion being designated by the reference numerals 20 and 21 indicating the exposed portions thereof located between the flanges 17, 18 and 19. In a preferred embodiment the portion of the drive wire 11 that runs back and forth along the guide rail has a plastic covering which reduces friction, thereby enabling the wire to move smoothly through the guide rail, reduces wear of the components and makes the running of the wire through the guide rail quieter. Preferably, with such a form of guide wire, the fitting 16 is manufactured of a compatible plastic and is received over the plastic covering of the drive wire and secured in place by thermal bonding, by solvent bonding or by a suitable adhesive.

The coupling further includes a receptacle that is indicated generally by the reference numeral 22. In the embodiment shown in FIGS. 2 to 4 of the drawings the receptacle is constituted by a flange that is integral with the anchor member 12 and that curves downwardly and then upwardly to define a receiving space 23 for the fitting 16. The width of the space is slightly greater than the diameter of the shaft portion 20 of the fitting 16, thereby to enable the fitting to be received through the top opening into the space 23. The free end of the flange has a slot 25 that is of a width substantially equal to the width of flange 18 on the fitting and is open at the upper end, thereby enabling the flange 18 to be partly received in the slot 25. The anchor means has a pair of holes 24 and 26 that receive portions of the flanges 18 and 19 on the fitting 16.

Figure 4:
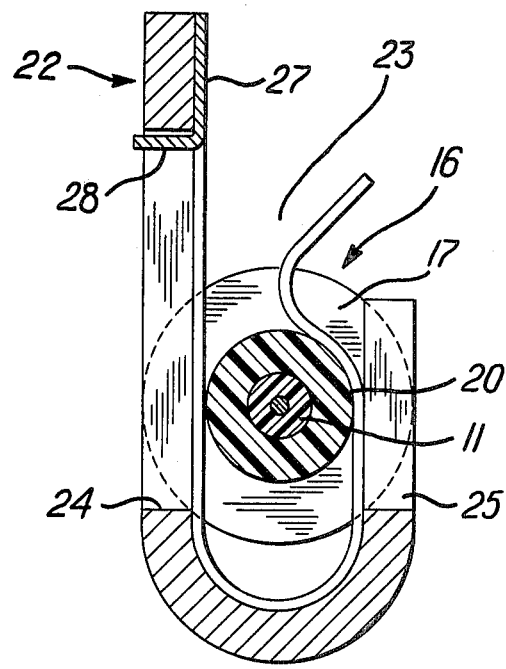
FIG. 4 is an end-cross sectional view of the coupling shown in FIGS. 2 and 3, the view being on an enlarged scale and the cross-section being taken generally along a plane designated by the lines labelled X—X in FIG. 3 and in the direction of the arrows.

The fitting 16 is held in position in the receptacle 22 by a retainer leaf spring 27 that is shaped, as viewed from the end, substantially to match the internal shape of the receptacle space 23 and that includes a pair of inturned leg portions that partially overlie the shaft portions 20 and 21 of the fitting 16, as shown clearly in FIG. 4. The leaf spring is held in position in the receptacle 22 by a tab 28 that extends out from the rear wall and into the upper end of the slot 24, which end it engages and by which end it is held down in position.

To assemble the coupling, the fully-assembled guide group B will arrive at the vehicle assembly line with the retainer leaf spring 27 in position. Similarly the drive group C will arrive at the vehicle assembly line with the fitting 16 joined to the free end of the drive wire 11. At a suitable point in the assembly of the vehicle after both groups B and C have been installed, a worker completes the connection of the drive group to the guide group by pushing the anchor member 12 to its rearward-most position in which the receptacle extends out through the end of the guide rail 10 and then positions the fitting 16 above the space 23 of the receptacle with the flange 18 in alignment with the slot 25 in the receptacle 22 and finally simply pushes the fitting 16 down into position. The resilient legs of the leaf spring 27 deflect out of the way of the entering fitting 16 and then spring back into the retaining position shown in FIG. 4. After this simple assembly procedure, the drive wire 11 is firmly joined to the movable anchor 12. The outermost two flanges 17 and 19 of the fitting straddle the flange portion of the receptacle 22 and engage the ends thereof to transmit pushing and pulling forces imposed by the drive wire 11 on the movable anchor 12. Drive forces are also transmitted from the portions of the flanges 18 and 19 to the edges of the holes 24 and 26 that receive them. Finally, the flange 17 also engages the rear edge of the anchor member 12 to impart pushing forces in the course of moving the anchor member from the restraint position to the release position.

Should it ever be necessary to disassemble the seat belt assembly for repair or replacement of damaged or broken components, it is very easy to do so by simply backing the anchor assembly out through the rearward end of the guide rail 10 to expose the coupling and then pushing the fitting 16 up out through the open top of the receptacle 22. The leaf spring retainer 27 will deflect to allow the fitting to be removed.

The assembly may also include an end piece (not shown) for the rearward end of the guide rail 10. Such an end piece may be supplied as part of the drive group and temporary located rearwardly of the fitting 16 and slipped on to the end of the guide rail after connection is made between the drive wire and the movable anchor and, finally, suitably secured to the end of the guide rail. Such an end piece will normally have a socket for receiving the front end of the sheath 14 for the drive wire.

Figure 2:
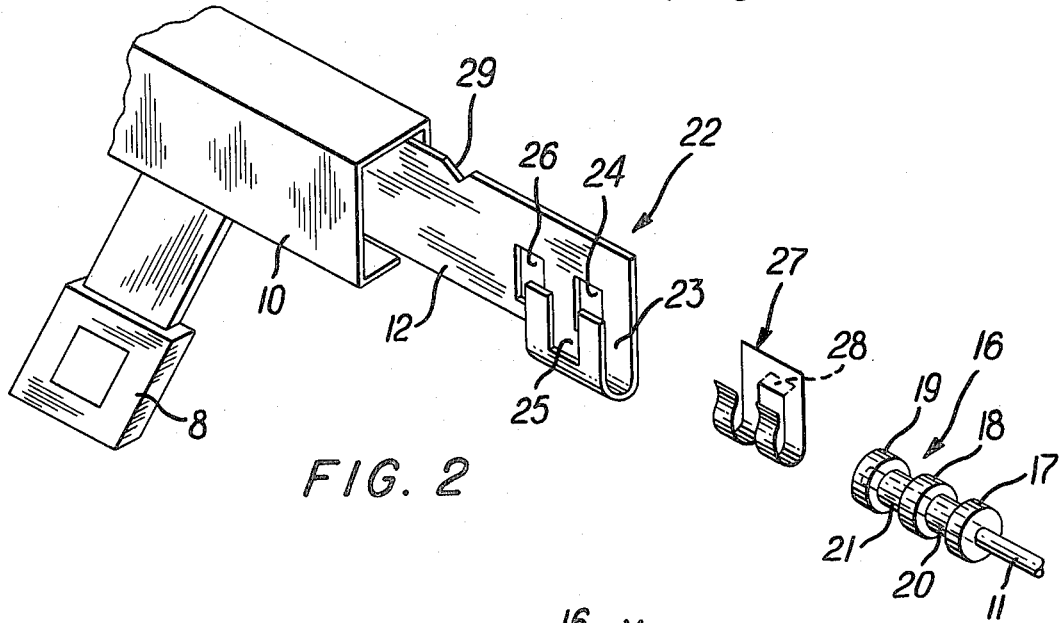
FIG. 2 is an exploded pictorial view of one embodiment of coupling in accordance with the present invention.
Figure 3:
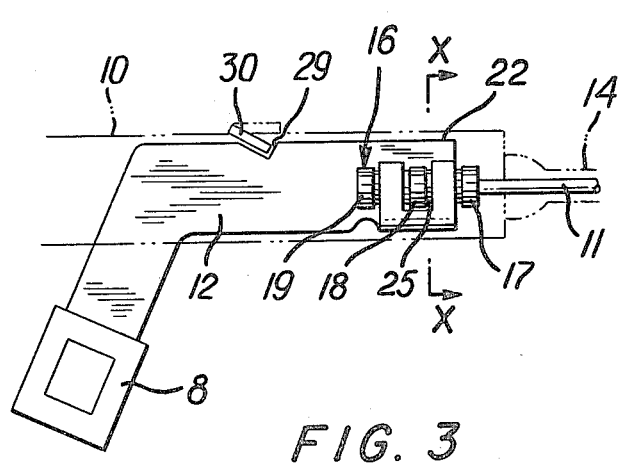
FIG. 3 is a side elevational view of the coupling shown in FIG. 2.
Figure 5:
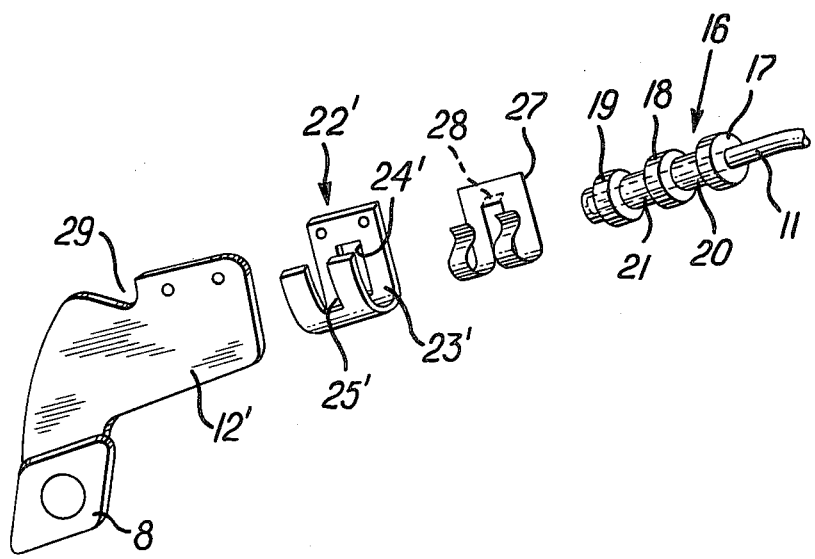
FIG. 5 is an exploded pictorial view of another embodiment of the present invention.

The embodiment shown in FIGS. 2 to 4 and described above is susceptible of numerous variations and modifications that will be readily apparent to those skilled in the art without departing from the spirit and scope of the invention. For example, a modification of this type is illustrated in FIG. 5. For the most part the coupling is identical to the one shown in FIGS. 2 to 4. The only difference is that the receptacle is a seperate member 22' having a medial slot 25' in the front flange, a hole 24' in the rear flange that defines the space 23' that receives the fitting 16. The thickness of the metal of the member 22' is sufficient to accept the projecting part of the flange portion 18 of the fitting, and the anchor member 12' need not, therefore, have a hole for the flange 18. Moreover the flange 19 will bear against the front edge of the member 22'. The member 22' is suitably secured to the anchor member 12' by rivets or screws installed through the holes shown in FIG. 5.

Another modification that is not illustrated in the drawings is the elimination of the outermost two flanges 17 and 19 from the fitting or the addition of more flanges and receiving holes.

Among the advantages of the invention is that the circular shape of the fitting 16 allows it to rotate in the receptacle 22 (or 22'). The possibility of the transmission of a rotational force to the anchor member 12 and the generation of torsion stresses in the wire 11 is, therefore, eliminated. The invention further has the advantage of being extremely easy to connect up and disconnect. It is simple and inexpensive to produce and affords considerable cost savings by enabling the guide group and drive group to be separately installed in the vehicle at different and convenient points along the assembly line. It is, therefore, an excellent solution to the problem described in the Background of the Invention section of this specification. The assembly and disassembly of the coupling do not require any special tools. The components of the coupling arrive at the assembly line in fully assembled condition in the respective groups, so there are no loose parts for the installer to have available and to manipulate. The work is done with the coupling fully exposed, rather than through a small opening where work is difficult.

I claim:

1. In a passive vehicle occupant restraint belt system having a belt transfer member engaging the belt and received for movement along a guide rail between a restraint location in which the belt is held in a configuration for restraining the occupant and a release location in which the belt is held in a configuration for releasing the occupant and an elongated drive element driven by a drive device in response to opening and closing movements of the vehicle door and adapted to transmit motion to the belt transfer member from the drive device, the improvement comprising a fitting fastened on the end portion of the drive element and having a shaft portion extending coaxially with the end portion of the drive element and at least one annular flange portion of a diameter substantially greater than the diameter of the shaft portion projecting generally radially from the shaft portion, a generally U-shaped receptacle on the transfer member having a width large enough to accept the shaft portion of the fitting and substantially less than the diameter of the flange portion and having oppositely located openings receiving parts of the flange portion of the fitting with said parts of the flange portions engaging edges of the openings that lie transverse to the axis of the guide rail, and a generally U-shaped retainer leaf spring received and held in place in the receptacle and having spaced-apart resilient leg portions straddling the flange portion and partly overlying the shaft portion of the fitting, the leg portions being resiliently deflectable to permit the fitting to be pushed into the receptacle into a position in which the leg portions retain it therein.

2. The improvement claimed in claim 1 wherein the retainer leaf spring has a tab that is received in one of the openings of the receptacle and engages an end of said slot for retention of the spring in the receptacle.

3. The improvement claimed in claim 1 or claim 2 wherein the fitting has three annular projecting flange portions that are spaced-apart from each other lengthwise of the shaft portion, and the receptacle has openings receiving portions of at least two of the flange portions of the fitting with parts of the flange portions engaging the edges of the openings.

4. The improvement claimed in claim 3 wherein parts of the outermost two of the three flange portions of the fitting straddle and engage opposite edges of a leg portion of the receptacle, said leg portion being a flange and having a generally medial slot opening at the free end thereof that receives the middle flange of the fitting.

* * * * *